United States Patent
Gavela et al.

(10) Patent No.: US 11,796,069 B2
(45) Date of Patent: Oct. 24, 2023

(54) VALVE INSERT SYSTEM

(71) Applicant: Cameron International Corporation, Houston, TX (US)

(72) Inventors: Sandra Gavela, Houston, TX (US); Zachary Walters, Houston, TX (US); Codie Smith, Carmichaels, PA (US); Loc Gia Hoang, Houston, TX (US); Eric Miller, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 17/756,526

(22) PCT Filed: Dec. 18, 2020

(86) PCT No.: PCT/US2020/065804
§ 371 (c)(1),
(2) Date: May 26, 2022

(87) PCT Pub. No.: WO2021/127310
PCT Pub. Date: Jun. 24, 2021

(65) Prior Publication Data
US 2023/0003305 A1    Jan. 5, 2023

Related U.S. Application Data

(60) Provisional application No. 62/950,008, filed on Dec. 18, 2019.

(51) Int. Cl.
*F16K 3/36* (2006.01)
*F16K 3/20* (2006.01)
(Continued)

(52) U.S. Cl.
CPC ............ *F16K 3/36* (2013.01); *E21B 43/2607* (2020.05); *F16K 3/0227* (2013.01); *F16K 3/207* (2013.01);
(Continued)

(58) Field of Classification Search
CPC ... F16K 3/207; F16K 3/20; F16K 3/36; F16K 3/0227; F16K 31/508; F16K 31/60; F16K 41/023; E21B 43/2607; E21B 43/26
See application file for complete search history.

(56) References Cited

U.S. PATENT DOCUMENTS 2,030,458 A * 2/1936 McKellar ................ F16K 3/207
                                                                                137/246.22
3,044,741 A * 7/1962 Grove ..................... F16K 3/207
                                                                                    251/328

(Continued)

FOREIGN PATENT DOCUMENTS

CN    1215463 A * 4/1999 ............. F16K 3/207
GB    1140372 A * 1/1969
(Continued)

OTHER PUBLICATIONS

International Search Report and Written Opinion issued in PCT Application PCT/US2020/065804, dated Apr. 9, 2021 (10 pages).

*Primary Examiner* — David Colon-Morales
(74) *Attorney, Agent, or Firm* — Matthew Goode

(57) ABSTRACT

A system including a valve. The valve includes a valve body having an interior volume and a bore along a first axis. A stem extends along a second axis and a flow control element couples to the stem. The stem selectively moves the flow control element through the interior volume between a closed position and an open position relative to the bore. A valve insert system retains a pressurized lubricant in the interior volume.

16 Claims, 5 Drawing Sheets

(51) Int. Cl.
  *E21B 43/26* (2006.01)
  *F16K 3/02* (2006.01)
  *F16K 31/50* (2006.01)
  *F16K 31/60* (2006.01)
  *F16K 41/02* (2006.01)
(52) U.S. Cl.
  CPC ............ *F16K 31/508* (2013.01); *F16K 31/60* (2013.01); *F16K 41/023* (2013.01)

(56) References Cited

U.S. PATENT DOCUMENTS

| | | | | |
|---|---|---|---|---|
| 3,078,865 A * | 2/1963 | Estes | F16K 3/36 | 137/246.22 |
| 3,181,552 A * | 5/1965 | Jackson, Jr. | F16K 3/36 | 137/246.12 |
| 3,347,261 A * | 10/1967 | Yancey | F16K 3/207 | 137/246.22 |
| 3,827,673 A * | 8/1974 | Houlgrave | F16K 3/0227 | 251/360 |
| 4,068,821 A * | 1/1978 | Morrison | F16K 3/207 | 251/328 |
| 4,083,376 A * | 4/1978 | Alaniz | F16K 3/207 | 137/246.22 |
| 4,095,612 A * | 6/1978 | Hardcastle | F16K 3/0227 | 137/246.22 |
| 4,136,710 A * | 1/1979 | Bond | F16L 55/10 | 137/246.22 |
| 4,192,483 A * | 3/1980 | Combes | F16K 3/207 | 277/910 |
| 4,281,819 A * | 8/1981 | Linder | F16K 39/04 | 251/282 |
| 4,741,509 A * | 5/1988 | Bunch | F16K 3/0236 | 251/327 |
| 4,878,651 A * | 11/1989 | Meyer, Jr. | F16K 3/0236 | 251/328 |
| 4,923,171 A * | 5/1990 | Beson | F16K 5/201 | 251/167 |
| 5,090,661 A * | 2/1992 | Parks, Jr. | F16K 3/0227 | 251/174 |
| 5,201,872 A * | 4/1993 | Dyer | F16K 3/0236 | 251/328 |
| 5,320,327 A * | 6/1994 | Beson | F16K 5/201 | 251/174 |
| 5,341,835 A * | 8/1994 | Lanning, II | F16K 3/0227 | 137/246.22 |
| 5,445,359 A * | 8/1995 | Beson | F16K 3/207 | 251/167 |
| 5,624,101 A * | 4/1997 | Beson | F16K 3/20 | 251/174 |
| 5,727,775 A * | 3/1998 | Rodger | E21B 34/02 | 251/328 |
| 6,082,707 A * | 7/2000 | Hosie | F16K 5/205 | 251/181 |
| 6,260,822 B1 * | 7/2001 | Puranik | F16K 3/0236 | 251/328 |
| 6,279,875 B1 * | 8/2001 | Chatufale | F16K 3/207 | 251/328 |
| 6,648,001 B2 | 11/2003 | Chatufale | | |
| 6,688,324 B2 * | 2/2004 | Hoang | E21B 43/16 | 251/327 |
| 6,966,537 B2 * | 11/2005 | Sundararajan | F16K 3/0227 | 251/175 |
| 7,004,452 B2 * | 2/2006 | Chatufale | F16K 3/0227 | 251/329 |
| 8,662,473 B2 * | 3/2014 | Comeaux | F16K 3/20 | 251/328 |
| 8,672,295 B2 * | 3/2014 | Dhawan | F16K 3/20 | 251/328 |
| 8,695,637 B2 * | 4/2014 | McBride | F16K 39/04 | 251/193 |
| 8,936,100 B2 * | 1/2015 | Mosman | F16K 31/445 | 166/368 |
| 8,973,897 B2 * | 3/2015 | Cordova | F16K 3/02 | 251/327 |
| 9,145,979 B2 * | 9/2015 | Hoang | F16K 31/04 | |
| 9,453,578 B2 * | 9/2016 | Sundararajan | F16K 3/20 | |
| 9,850,740 B2 * | 12/2017 | Atencio | F16K 3/207 | |
| 10,072,763 B2 * | 9/2018 | Chen | F16K 3/0236 | |
| 10,233,721 B2 * | 3/2019 | Hoang | F16K 25/04 | |
| 10,378,659 B2 * | 8/2019 | Scott | F16K 3/0281 | |
| 10,982,808 B2 * | 4/2021 | Zerkus | E21B 43/2607 | |
| 11,047,485 B2 * | 6/2021 | Al-Jarallah | F16K 3/188 | |
| 11,174,958 B2 * | 11/2021 | Moseley | F16K 3/16 | |
| 2011/0083746 A1 * | 4/2011 | Hoang | F16K 37/0091 | 137/511 |
| 2019/0211647 A1 | 7/2019 | Hoang et al. | | |

FOREIGN PATENT DOCUMENTS

| | | | |
|---|---|---|---|
| GB | 1181228 A * | 2/1970 | |
| GB | 1311643 A * | 3/1973 | |
| JP | 61122462 U | 8/1986 | |
| JP | S61122462 U * | 8/1986 | |
| JP | 2000249235 A | 9/2000 | |
| WO | WO-2017158077 A1 * | 9/2017 | ............ E21B 29/04 |

* cited by examiner

VALVE INSERT SYSTEM

CROSS-REFERENCE TO RELATED APPLICATION

The present document is based on and claims priority to U.S. Provisional Application Ser. No. 62/950,008, filed Dec. 18, 2019, which is incorporated herein by reference in its entirety.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Valves are used in a variety of applications to manage and transmit flows of materials. Valves generally can be placed in an open position that enables fluid flow through a primary flow path and a closed position that reduces or completely shuts off that flow path. However, when transporting a proppant containing fluid (e.g., frac fluid), proppant may enter crevices or affect interfaces of the valve, causing undesirable wear and/or a reduction in the useful life of the valve.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to valves for controlling fluid flow. More specifically, some embodiments relate to gate valves for controlling the flow of fracturing fluid in fracturing systems. The gate valves can include seat assemblies configured to retain pressurized lubricant within an interior volume. In some embodiments, the seat assemblies include telescoping seat assemblies responsive to fluid pressure to reinforce sealing. For example, in one embodiment a telescoping seat assembly includes a first seat ring telescopically received by a second seat ring and fluid pressure biases the first seat ring against the gate of a gate valve.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying figures in which like characters represent like parts throughout the figures, wherein.

DETAILED DESCRIPTION OF SPECIFIC EMBODIMENTS

Figure 1:
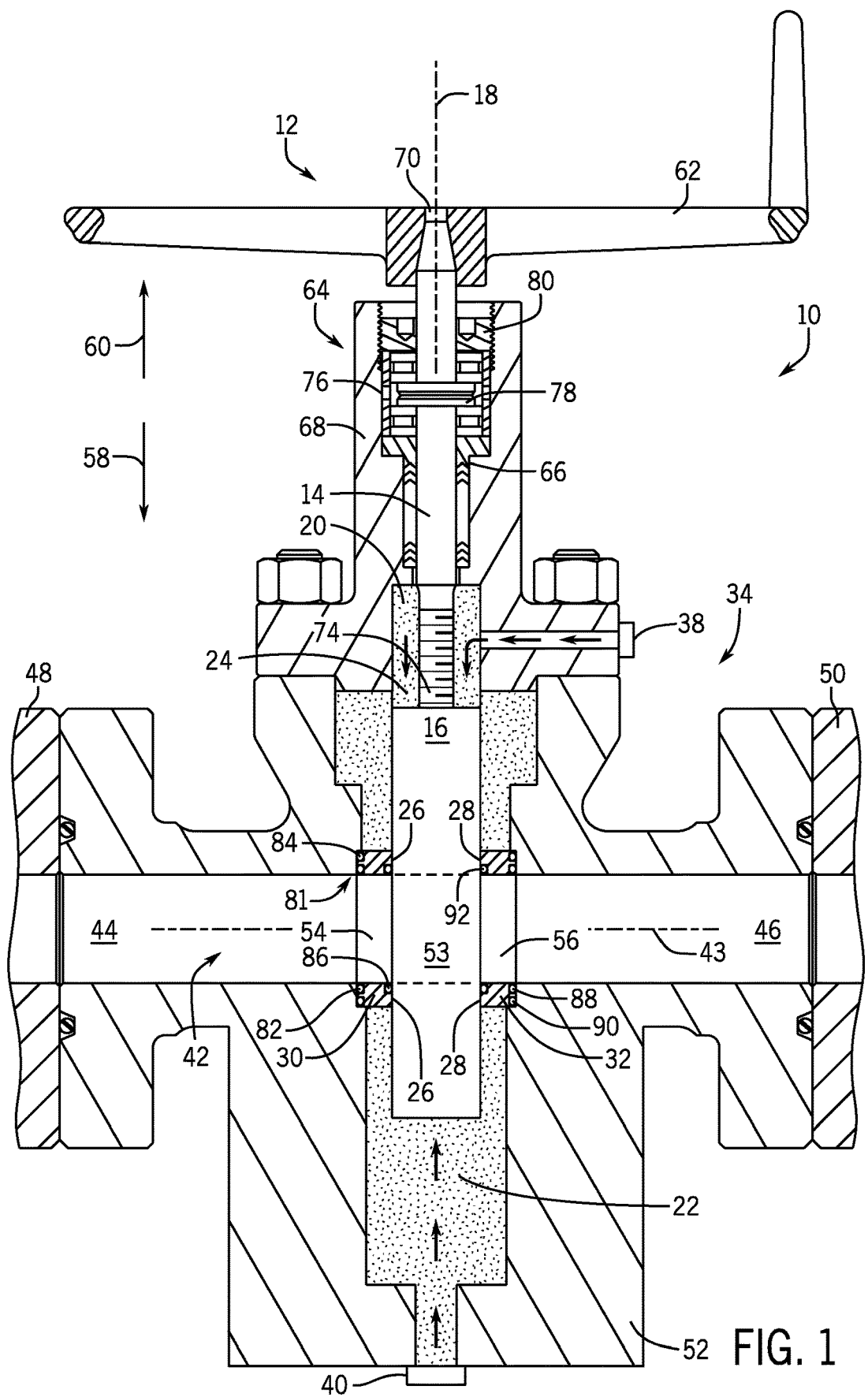
FIG. 1 is a cross-sectional side view of an embodiment of a gate valve according to an embodiment of the disclosure.

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

As used herein, the term "coupled" or "coupled to" may indicate establishing either a direct or indirect connection and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Fracing is a technique that enhances hydrocarbon production. Fracing, also referred to as fracturing or fracking, generally entails the injection of a proppant-laden frac fluid into the wellbore to fracture the formation and, in turn, increase the formation's yield. Typically, the frac fluid is injected into the wellbore via a frac tree that is mounted on the wellhead. The wellhead, along with the frac tree, provides access to the formation via a wellbore. Specifically, frac fluid from a frac fluid supply is routed to a goat head mounted to the frac tree. The frac tree has a series of valves, some of which may be gate valves, to control the ingress of frac fluid into the wellhead and, in turn, into the wellbore.

These gate valves include a flow control element that transitions between open and closed positions to enable or block fluid flow (e.g., frac fluid). For example, the gate valve may control the flow of a proppant-laden fluid (e.g., frac fluid), corrosive fluid, etc. When controlling the flow of proppant-laden fluid, the proppant (e.g., sand, ceramic, etc.) may enter an interior volume of the gate valve, as well as interfaces between the flow control element and valve seats. To mitigate the negative impacts of proppant in the volume, a lubricant can be injected into the volume. The disclosed embodiments include a gate valve with a valve insert system with seats and seals that retain a pressurized lubricant in the interior volume. In operation, the seals, seats, and pressurized lubricant block proppant from entering an interior volume of the gate valve.

FIG. 1 is a cross-sectional view of a gate valve 10 in an open position. As illustrated, the gate valve 10 includes an actuator assembly 12 that moves a valve stem 14 coupled to a flow control element 16. As the actuator drives the valve stem 14 along a central axis 18, the gate valve 10 opens and closes. In a closed position, the gate valve 10 blocks the flow of a fluid (e.g., proppant-containing fluid) with a fluid tight seal, while the open position enables the fluid to flow freely through the gate valve 10. Unfortunately, during operation, proppant in a proppant-laden fluid may enter first and second chambers 20 and 22 (e.g., annular, square, rectangular chambers) of a gate valve interior volume 24 (shown here as a gate cavity transverse to the flow bore) and enter interfaces 26 and 28 between the flow control element 16 and upstream and downstream seats 30 and 32 (e.g., annular metal seats). This can wear the seats and clog the interfaces, making it difficult to move the control element. However, the gate valve 10 may include a valve insert system 34 and a pressurized lubricant (e.g., grease) may block the movement of proppant into the first and second chambers 20 and 22. In operation, lubricant may be pumped into the first and second chambers 20 and 22 of the interior volume through respective lubrication supply ports 38 and 40 (e.g., through grease fittings), pressurizing the lubricant in the first and second chambers 20 and 22. The pressure of the lubricant in the chambers 20 and 22 may be controlled during operation and monitored (e.g., via a pressure gauge) in any suitable manner. In some embodiments, a single lubrication port supplies lubricant to the first and second chambers 20 and 22. In some embodiments, the lubricant may be a very viscous lubricant such as grease with a viscosity in excess of 5000 centistokes.

As illustrated, the gate valve 10 includes an inlet passage 44 and an outlet passage 46 that fluidly couple to the gate valve interior volume 24 to form the passage 42. In operation, fluid (e.g., proppant-containing fluid) may flow along a flow axis 43 from an upstream component 48 (e.g., pipe or another valve) to a downstream component 50 (e.g., pipe or another valve) which transports the fluid into a well during fracing operations. In such an embodiment, the gate valve 10 may be used in an on/off manner to allow or block flow from the upstream component 48 through the gate valve 10 and into the downstream component 50. In other embodiments, the gate valve 10 may be used to regulate (e.g., choke) flow from the upstream component 48 to the downstream component 50.

As explained above, the gate valve 10 includes a valve stem 14 (e.g., an elongated rod) that couples to the flow control element 16. For example, the valve stem 14 may couple to the flow control element 16 via threading. However, in other embodiments, the flow control element 16 may attach to the valve stem 14 using other connection joints, such as T-slots, pins, lift nuts, bolts, clamps, welds, and so forth. As illustrated, the flow control element 16 (e.g., gate or slab) includes a port 53 that selectively allows a fluid through a valve body 52, when the flow control element 16 is in an open position. In FIG. 1, the flow control element 16 is in an open position, so the port 53 generally aligns with openings 54 and 56 within the seat 30 and the outlet seat 32, respectively, to open a passage 42. By moving the flow control element 16 in directions 58 and 60 along the central axis 18, the port 53 aligns or misaligns with the openings 54 and 56 in the seat 30 and the outlet seat 32, which enables or blocks the flow of the fluid through the valve body 52 of the gate valve 10. It should be appreciated that the gate valve 10 may be bi-directional, and the terms "inlet" and "outlet" are used for ease of reference and do not describe any specific directional limitation of the gate valve 10. For example, the seats 30, 32 may be either inlet or outlet seats, respectively.

As described above, the gate valve 10 includes the actuator assembly 12, which opens and closes the gate valve 10 by moving the flow control element 16. The actuator assembly 12 may include the valve stem 14, hand wheel 62 (e.g., manual actuator), and bearing assembly 64. In some embodiments, the actuator assembly 12 may include a powered drive system, such as a hydraulic or electric drive system, for automatic actuation. As illustrated, the valve stem 14 extends through an aperture 66 in a bonnet 68. This enables the valve stem 14 to couple to the hand wheel 62 (e.g., actuator) and to the flow control element 16. More specifically, the hand wheel 62 couples to portion 70 of the valve stem 14, while a second threaded end portion 74 threadingly couples to the flow control element 16. In operation, an operator opens and closes the gate valve 10 by rotating the hand wheel 62 (e.g., manual actuator) or engaging a powered drive system to thread the second threaded end portion 74 in and out of the flow control element 16. For example, as the valve stem 14 threads into the flow control element 16, the gate valve 10 opens as the flow control element 16 moves in direction 60. Similarly, when the valve stem 14 threads out of the flow control element 16, the gate valve 10 closes as the flow control element 16 moves in direction 58. The bearing assembly 64 facilitates rotation of the valve stem 14 by surrounding and aligning the valve stem 14 in the aperture 66. In some embodiments, the bearing assembly 64 rests within a counterbore 76 and surrounds a flange 78 on the valve stem 14. The gate valve 10 retains the bearing assembly 64 and valve stem 14 within the bonnet 68 with a threaded nut 80 that threads into the counterbore 76.

As explained above, the gate valve 10 may include a valve insert system 34 that blocks or reduces the flow of proppant into the first and second chambers 20 and 22 while simultaneously containing a pressurized lubricant within the first and second chambers 20 and 22. The pressurized lubricant in combination with the valve insert system 34 limits or blocks the flow of proppant into the chambers 20 and 22, which may interfere with the opening and closing of the flow control element 16.

The valve insert system 34 includes the seats 30 and 32 and seals 81. In some embodiments, the seals 81 can be metallic or non-metallic seals (e.g., polytetrafluoroethylene (PTFE), another thermoplastic, or elastomer). The seals 81 couple to the seats 30 and 32 and form a seal with the valve body 52 and with the flow control element 16. As illustrated, the seat 30 may include an upstream inner diameter seal 82 and an upstream outer diameter seal 84 that form a seal between the seat 30 and the valve body 52. The seat 30 may also include a downstream seal 86 that forms a seal between the seat 30 and the flow control element 16. In some embodiments, there may be only one seal (e.g., seal 86) or no seal positioned between the seat 30 and the flow control element 16 (in which case the seat 30 may press directly against the flow control element 16 for metal-to-metal sealing). A single seal may enable sealing while reducing the friction involved in cycling the flow control element 16 between open and closed positions. It should be understood that the number of seals 81 between the seat 30 and the valve body 52 and between the seat 30 and the flow control element 16 may vary (e.g., 1, 2, 3, 4, 5).

The seat 32 similarly includes seals 81 between the seat 32 and the valve body 52 and the flow control element 16. For example, the valve insert system 34 may include a downstream inner diameter seal 88 and a downstream outer diameter seal 90 that form a seal between the seat 32 and the valve body 52. The seat 32 may also include an upstream seal 92 that forms a seal between the seat 32 and the flow control element 16. In some embodiments, there may be only one seal (e.g., seal 92) or no seal positioned between the seat 32 and the flow control element 16 (in which case the seat 32 may press directly against the flow control element 16 for metal-to-metal sealing). As explained above, a single seal may enable sealing while reducing the friction involved in cycling the flow control element 16 between open and closed positions. It should be understood that the number of seals 81 between the seat 32 and the valve body 52 and between the seat 32 and the flow control element 16 may vary (e.g., 1, 2, 3, 4, 5).

Figure 2:
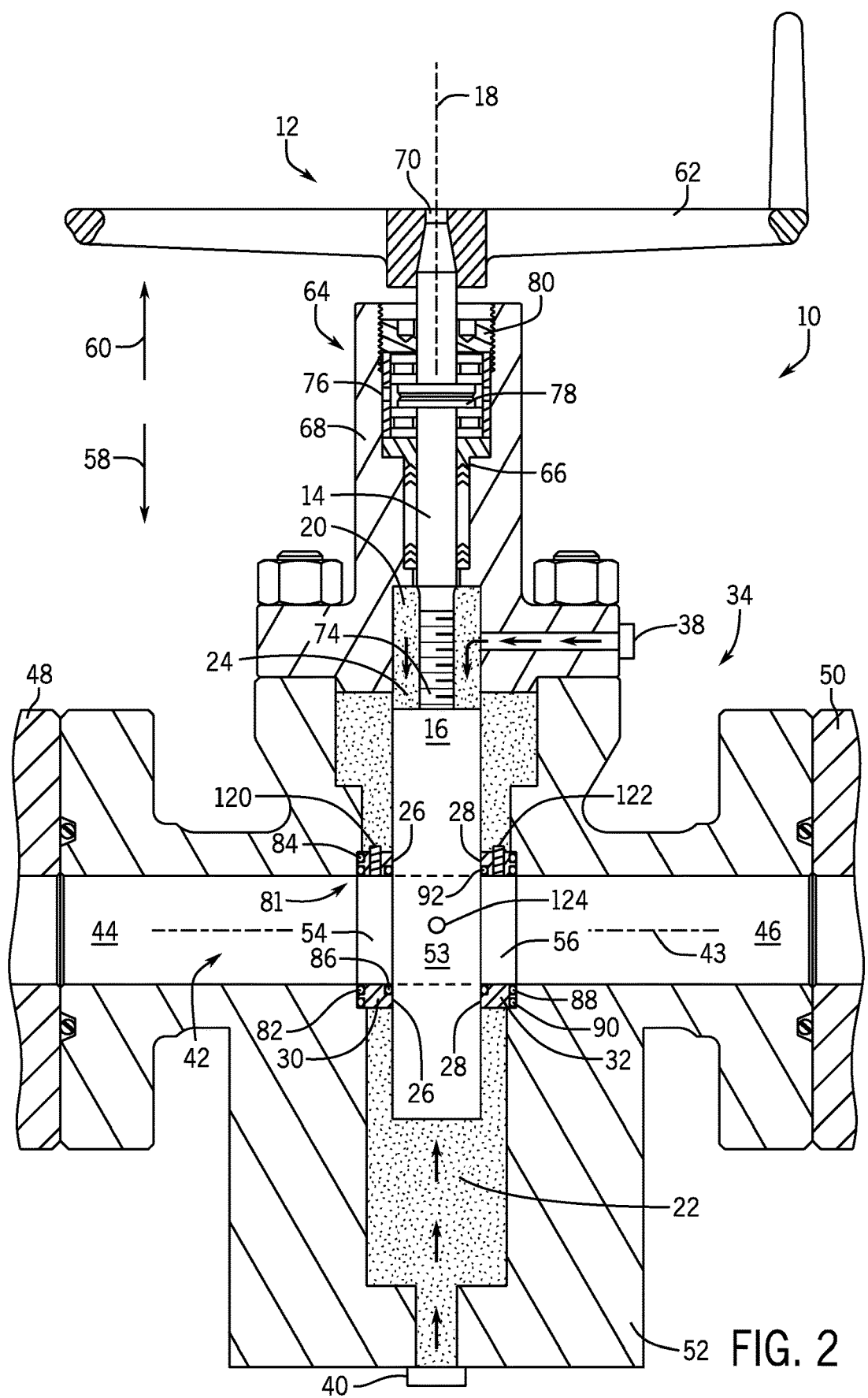
FIG. 2 is a cross-sectional side view of an embodiment of a gate valve according to an embodiment of the disclosure.

FIG. 2 is a cross-sectional side view of an embodiment of the gate valve 10. In some embodiments, the gate valve 10 may include one or more check valves (e.g., 1, 2, 3, 4, 5) that enable flow line pressure to enter the first and second chambers 20, 22 when the pressurized lubricant inside of the chambers 20 and 22 is lower than the flow line pressure in passage 42. Once pressurized, the check valves maintain the pressure in the first and second chambers 20, 22. The check valves may be placed in the seats 30 and 32 as well as in the flow control element 16. For example, the seat 30 may include a check valve 120, the seat 32 may include a check valve 122, and the flow control element 16 may include a check valve 124. In operation, these check valves enable the use of flow line pressure to pressurize the lubricant when the lubricant pressure is lower than flow line pressure. For example, the lubricant in the chambers 20 and 22 may be periodically cleared to remove lubricant that contains proppant. New lubricant is injected into ports 38 and/or 40 and pressurized inside chambers 20 and 22. If the flow line pressure is higher than the injected pressure of the lubricant, the check valves allow flow line pressure to enter chambers 20 and 22 equalizing the chamber pressure with the flow line pressure blocking or reducing proppant flow through other seal faces.

Figure 3:
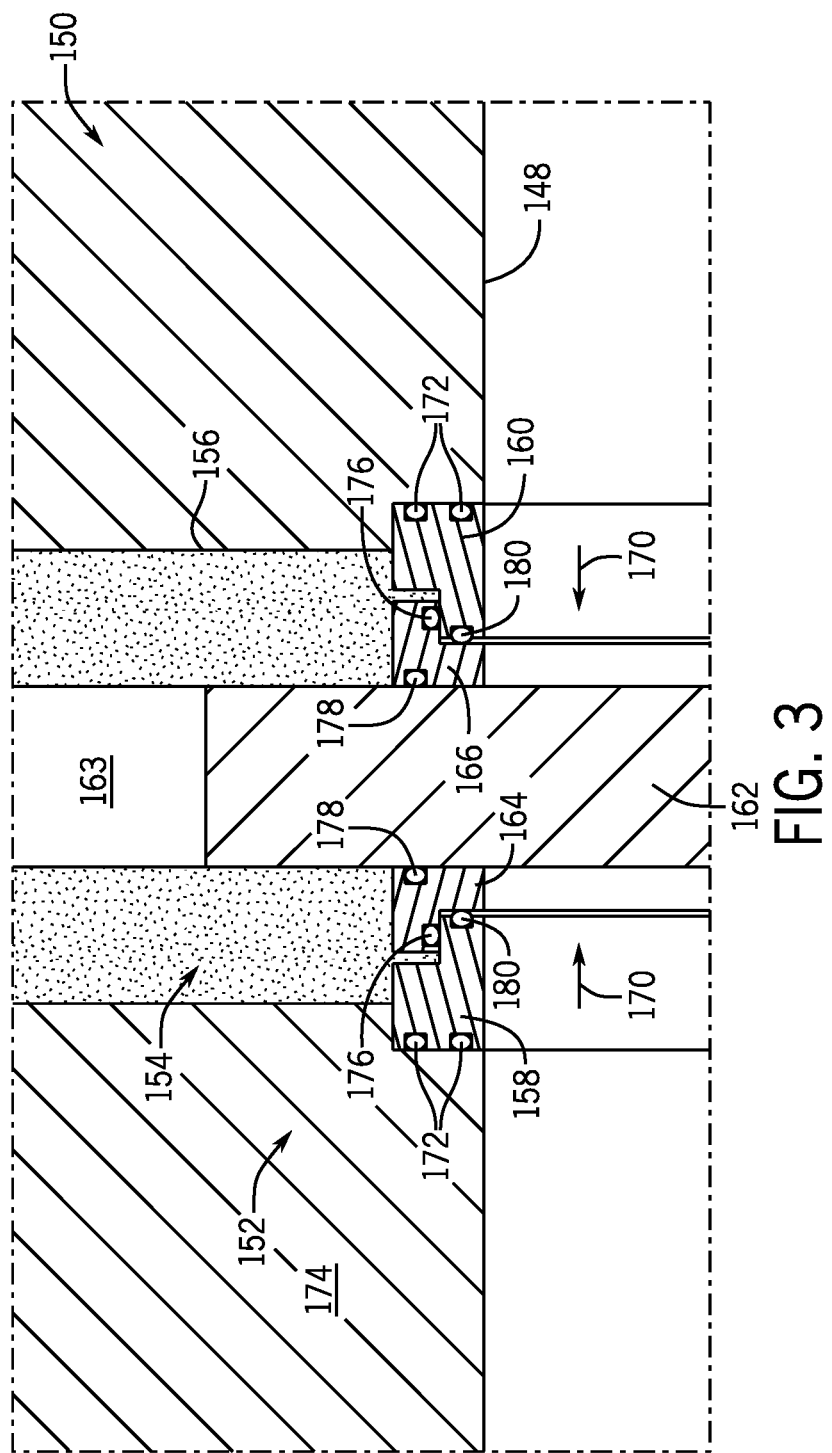
FIG. 3 is a partial cross-sectional side view of an embodiment of a gate valve according to an embodiment of the disclosure.

FIG. 3 is a partial cross-sectional side view of an embodiment of a gate valve 150 that includes a flow bore 148 and a valve insert system 152 that retains a pressurized lubricant 154 in a chamber(s) 156 (shown here in a gate cavity transverse to the flow bore 148) in the gate valve 150 to block proppant from entering chamber 156. As noted above, the lubricant 154 may be pressurized by injecting the lubricant 154 into the chamber 156 through a grease fitting, and the pressure of the lubricant 154 within the chamber 156 may be controlled and monitored in any suitable manner. The valve insert system 152 includes an upstream seat 158 and a downstream seat 160. To form a seal with a flow control element 162 (e.g., a gate having an aperture or port 163 to selectively allow flow through the flow bore 148), the seats 158 and 160 couple to respective telescoping seats 164 and 166. As shown in FIG. 3, a first telescoping seat assembly (including seats 158 and 164) is positioned on one side of the flow control element 162 and a second telescoping seat assembly (including seats 160 and 166) is positioned on an opposite side of the flow control element 162. The depicted telescoping seat assemblies are provided along the flow bore 148 and positioned radially between the flow bore 148 and the chamber 156 to block flow therebetween. The seats 158, 160, 164, and 166 may be provided as annular seats (e.g., seat rings of metal or another material) or in any other suitable form. As shown in FIG. 3, the seats 158 and 160 are nested within the telescoping seats 164 and 166 (with ends of the seats 158 and 160 received within the telescoping seats 164 and 166), but it will be appreciated that the telescoping seats 164 and 166 could instead be nested within the seats 158 and 160.

The telescoping seats 164 and 166 can move independently from their respective seats 158 and 160. In operation, the telescoping seat assemblies are responsive to pressure in the chamber 156, using the pressure of the lubricant 154 to expand and reinforce sealing between the flow control element 162 and the valve body 174. More specifically, as the lubricant 154 enters a gap between upstream seat 158 and telescoping seat 164 and a gap between seat 160 and telescoping seat 166, the pressure of the lubricant 154 biases the telescoping seats 164 and 166 against the flow control element 162 (generally in the directions indicated by arrows 170). Similarly, the lubricant pressure may also bias the seats 158 and 160 in directions opposite those of the telescoping seats 164 and 166 (i.e., against the valve body 174 in FIG. 3).

In some embodiments, the valve insert system 152 includes one or more seals 172 between the seats 158 and 160 and the valve body 174. The valve insert system 152 may also include one or more seals 176 between the telescoping seats 164 and 166 and the seats 158 and 160, one or more seals 178 between the flow control element 162 and telescoping seats 164 and 166, one or more additional seals 180 between the telescoping seats 164 and 166 and the seats 158 and 160, or any combination of such seals to facilitate sealing of the telescoping seat assemblies between the flow control element 162 and the valve body 174.

As shown in FIG. 3, the telescoping seat assemblies include annular seals 176 positioned to allow some lubricant 154 from the chamber 156 to enter the gap between the seat 158 and telescoping seat 164 and the gap between the seat 160 and telescoping seat 166 while blocking flow of the lubricant 154 from those gaps to the flow bore 148. The telescoping seats 164 and 166 seal against the flow control element 162 to also block flow of lubricant 154 from the chamber 156 to the flow bore 148; this sealing may be via one or more annular seals 178 carried by the telescoping seats 164 and 166, direct sealing contact of the telescoping seats 164 and 166 against the flow control element 162 (e.g., metal-to-metal sealing), or both. As depicted in FIG. 3, the seals 178 are larger in diameter than the seals 176 such that pressure of the lubricant 154 within the gaps between the seats 158 and 160 and their respective telescoping seats 164 and 166 pushes the telescoping seats 164 and 166 in the direction of the flow control element 162 more than the pressure of the lubricant 154 (if any) between the flow control element 162 and the telescoping seats 164 and 166 pushes the telescoping seats 164 and 166 away from the flow control element 162. Consequently, the pressure of the lubricant 154 in the chamber 156 provides a net force on the telescoping seats 164 and 166 toward the flow control element 162, which increases sealing contact pressure and reinforces sealing between these components.

The seals 172, 176, 178, and 180 are shown generically in FIG. 3 and can take any suitable forms. As noted above, the seals can be metallic or non-metallic seals (e.g., polytetrafluoroethylene (PTFE), another thermoplastic, or elastomer). In one embodiment, the seals 172 and 180 are annular lip seals, such as U-shaped lip seals (i.e., annular lip seals with a U-shaped cross-section) each having a resilient body with sealing lips at an open end of the body and an inner spring to bias the sealing lips against opposing surfaces. Pressure received within the open ends of the U-shaped lip seals may reinforce sealing of the lips against opposing surfaces. The seals 176 can be O-rings that allow the telescoping seats 164 and 166 to slidingly extend or retract with respect to the seats 158 and 160. Backing rings may be used to avoid extrusion of the O-rings. The seals 178 can be annular thermoplastic (e.g., PTFE) seals. In some instances, such as that shown in FIG. 3, the seals 172 and 180 are carried by the seats 158 and 160 and the seals 176 and 178 are carried by the telescoping seats 164 and 166.

Figure 4:
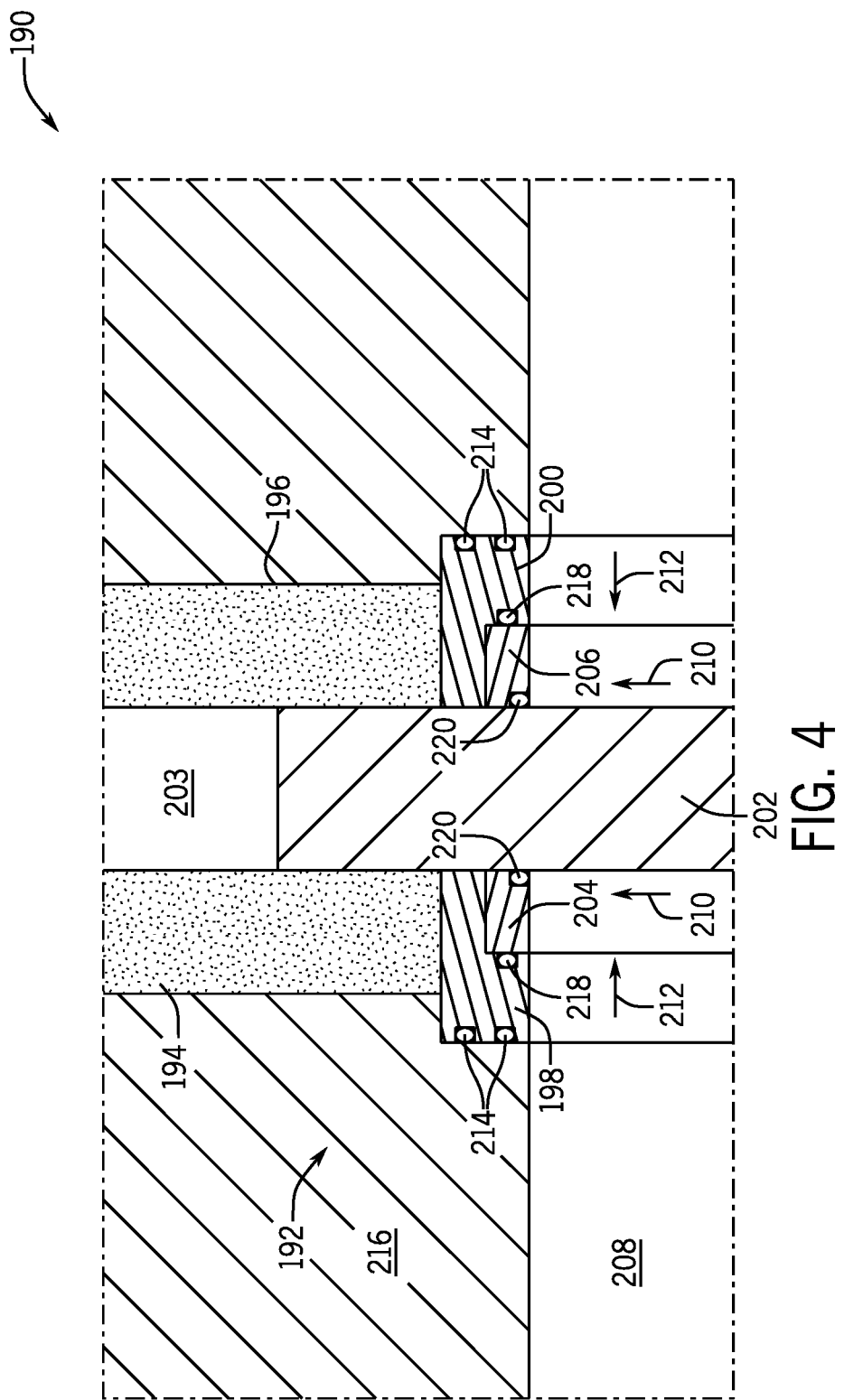
FIG. 4 is a partial cross-sectional side view of an embodiment of a gate valve according to an embodiment of the disclosure.

FIG. 4 is a partial cross-sectional side view of an embodiment of a gate valve 190 that includes a flow bore (passage) 208 and a valve insert system 192 that retains a pressurized lubricant 194 to block proppant or other substances from entering chambers 196 (shown here in a gate cavity transverse to the flow bore 208) in the gate valve 190. The lubricant 194 may be pressurized by injecting the lubricant 194 into the chamber 196 through a grease fitting, and the pressure of the lubricant 194 within the chamber 196 may be controlled and monitored in any suitable manner. The valve insert system 192 includes an upstream seat 198 and a downstream seat 200. To form a seal with a flow control element 202 (e.g., a gate having an aperture or port 203 to selectively allow flow through the flow bore 208), the seats 198 and 200 couple to respective telescoping seats 204 and 206. As shown in FIG. 4, a first telescoping seat assembly (with seats 198 and 204) and a second telescoping seat assembly (with seats 200 and 206) are positioned on opposite sides of the flow control element 202. Such as described above with respect to the embodiment depicted in FIG. 3, these telescoping seat assemblies in FIG. 4 are provided along the flow bore 208 and positioned radially between the flow bore 208 and the chamber 196, and the seats may be provided in any suitable form (e.g., metal seat rings).

The depicted telescoping seats 204 and 206 are nested within and can move independently from the seats 198 and 200. In operation, the telescoping seat assemblies are responsive to pressure within the passage 208, using the pressure of a fluid (e.g., frac fluid) flowing through the passage 208 of the gate valve 190 to reinforce sealing of the telescoping seats 204 and 206 with the flow control element 202. More specifically, pressurized fluid from the passage 208 may flow radially outward (as generally represented by arrows 210) into a gap between the seat 198 and the telescoping seat 204 and into a gap between the seat 200 and the telescoping seat 206 such that the flow bore pressure biases the telescoping seats 204 and 206 against the flow control element 202 (as generally represented by arrows 212).

In some embodiments, the valve insert system 192 includes one or more seals 214 between the seats 198 and 200 and the valve body 216. The valve insert system 192 may also include one or more seals 218 between the seats 204 and 206 and the seats 198 and 200. The telescoping seats 204 and 206 may seal against the flow control element 202 directly (e.g., metal-to-metal sealing), via one or more seals 220 carried by the telescoping seats 204 and 206, or both. As will be appreciated from the above discussion, the seals may be positioned to control ingress of fluid along radial surfaces of the telescoping seat assemblies such that the telescoping seats 204 and 206 are pressure-biased against the flow control element 202. The seals 214, 218, and 220 are shown generically in FIG. 4 and may take any suitable forms, such as those described above for seals 172, 176, 178, and 180.

Figure 5:
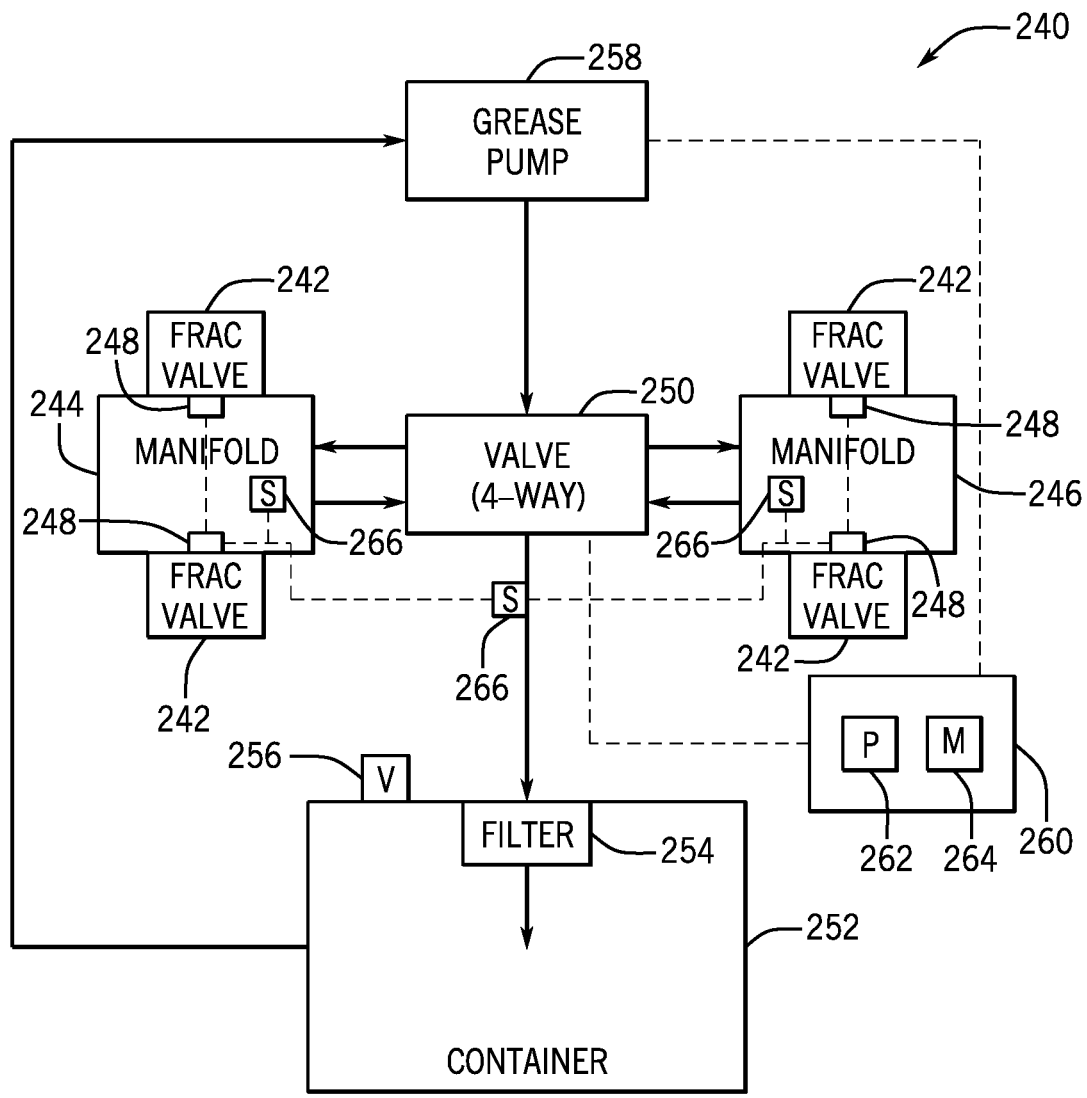
FIG. 5 is schematic view of a lubrication system according to an embodiment of the disclosure.

FIG. 5 is schematic view of a lubrication system 240 that pressurizes lubricant in one or more frac valves 242 (e.g., gate valves). As explained above, pressurizing lubricant in a gate valve may block or reduce proppant from flowing into chambers in the gate valve. As illustrated, the lubrication system 240 may include a first manifold 244 and a second manifold 246 that couple to respective frac valves 242. The manifolds 244 and 246 enable lubricant to flow into and out of the frac valves 242. In other words, the manifolds 244 and 246 enable the pressurization and depressurization of the frac valves 242. The flow of lubricant into and out of the frac valves 242 (e.g., into and out of chambers in the frac valves 242) is controlled with valves 248. These valves 248 may be pneumatic, electric, hydraulic, or a combination thereof.

To release the pressure of the lubricant in the frac valves 242 of the first manifold 244, the valves 248 are opened and the valve 250 (e.g., a four-way valve) is opened. The lubricant is then able to flow out of the frac valves 242 through the manifold 244 and into the valve 250. The valve 250 redirects the lubricant to a pressurized lubricant container 252. In some embodiments, the lubrication system 240 may include a filter 254 that filters particulate (e.g., proppant) out of the lubricant before it enters the lubricant container 252. As illustrated, the lubricant container 252 may include a pressure release valve 256 that releases excess pressure from the lubricant container 252.

In order to recharge the frac valves 242 coupled to the first manifold 244, the lubrication system 240 activates a pump 258. The pump 258 pumps lubricant from the lubricant container 252 through the valve 250 and into the first manifold 244. The lubricant flows through the first manifold 244 and passes through open valves 248 into the chambers of the frac valves 242. Once the frac valves 242 are sufficiently pressurized, the valves 248 may be closed.

The lubrication system 240 releases the pressurized lubricant and charges the frac valves 242 that couple to the second manifold 246 in the same way as that described above with respect to the first manifold 244. As will be appreciated, with a four-way valve 250, lubricant may be routed from either manifold 244 or 246 to the lubricant container 252 while lubricant is pumped from the container 252 to the other manifold 244 or 246. In some embodiments, the lubrication system 240 may include a controller 260 that controls the charging of the frac valves 242 with pressurized lubricant and the discharging of the pressurized lubricant from the frac valves 242. The controller 260 controls the movement of pressurized lubricant by controlling the valves 248, valve 250, and pump 258. The controller 260 includes one or more processors 262 that execute instructions stored on one or more memories 264 to control operation of the valves 248, valve 250, and pump 258. In some embodiments, the controller 260 may use feedback from one or more sensors 266 (e.g., pressure sensors) to control operation of the lubrication system 240.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosure and various embodiments with various modifications as are suited to the particular use contemplated.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
    a valve, comprising:
        a valve body having an interior volume and a bore along a first axis;
        a stem extending along a second axis;
        a flow control element coupled to the stem, wherein the stem is configured to selectively move the flow control element through the interior volume between a closed position and an open position relative to the bore;
        a valve insert system configured to retain a pressurized lubricant in the interior volume; and
        a check valve positioned to allow fluid in the bore to pass into the interior volume when pressure within the bore is greater than pressure within the interior volume.

2. The system of claim 1, wherein the valve insert system comprises a first seat and a first seal configured to seal against the flow control element to retain the pressurized lubricant in the interior volume.

3. The system of claim 2, wherein the valve insert system comprises a second seat and a second seal configured to seal against the flow control element to retain the pressurized lubricant in the interior volume.

4. The system of claim 3, wherein the first seal and the second seal are non-metallic seals.

5. The system of claim 1, wherein the valve is a gate valve and the flow control element is a gate.

6. The system of claim 5, wherein the valve insert system comprises a seat positioned along the bore between the valve body and a first side of the gate.

7. The system of claim 6, wherein the valve insert system comprises an additional seat positioned along the bore between the valve body and a second side of the gate that is opposite the first side.

8. The system of claim 5, wherein the valve insert system comprises a telescoping seat assembly positioned along the bore between the valve body and a first side of the gate, the telescoping seat assembly includes a first seat and a second seat coupled to the first seat, and the second seat is a telescoping seat responsive to pressure within the interior volume such that the pressure within the interior volume biases the telescoping seat toward the first side of the gate.

9. The system of claim 8, comprising a seal positioned to block flow between the bore and the interior volume along a side of the telescoping seat.

10. The system of claim 8, wherein the valve insert system comprises an additional telescoping seat assembly positioned along the bore between the valve body and a second side of the gate that is opposite the first side, the additional telescoping seat assembly includes a first additional seat and a second additional seat coupled to the first additional seat, and the second additional seat is an additional telescoping seat responsive to pressure within the interior volume such that the pressure within the interior volume biases the additional telescoping seat toward the second side of the gate.

11. The system of claim 1, wherein the flow control element includes the check valve.

12. The system of claim 1, wherein the valve insert system includes a seat having the check valve.

13. A method comprising:
    receiving a fracturing fluid in a bore of a frac valve, the frac valve including: a valve body having the bore and a cavity that is transverse to the bore; a gate positioned in the cavity and moveable between a closed position and an open position to control flow of the fracturing fluid through the bore; a telescoping seat assembly positioned radially between the bore and a chamber within the cavity, the telescoping seat assembly including a first seat ring telescopically received by a second seat ring; and a check valve positioned to allow the fracturing fluid in the bore to pass into the chamber when pressure within the bore is greater than pressure within the chamber; and
    biasing the first seat ring toward the gate via pressure of the fracturing fluid or of an additional fluid.

14. The method of claim 13, wherein biasing the first seat ring toward the gate includes receiving the fracturing fluid or the additional fluid within a gap between the first seat ring and the second seat ring.

15. The method of claim 14, wherein receiving the fracturing fluid or the additional fluid within the gap between the first seat ring and the second seat ring includes receiving a pressurized lubricant from the chamber within the cavity into the gap.

16. The method of claim 15, wherein receiving the pressurized lubricant from the chamber within the cavity into the gap biases the second seat ring against the valve body.

* * * * *